Dec. 17, 1929.  E. T. FERNGREN  1,739,960
DOWN FLOW SHEET GLASS APPARATUS
Filed Dec. 19, 1924    2 Sheets-Sheet 1
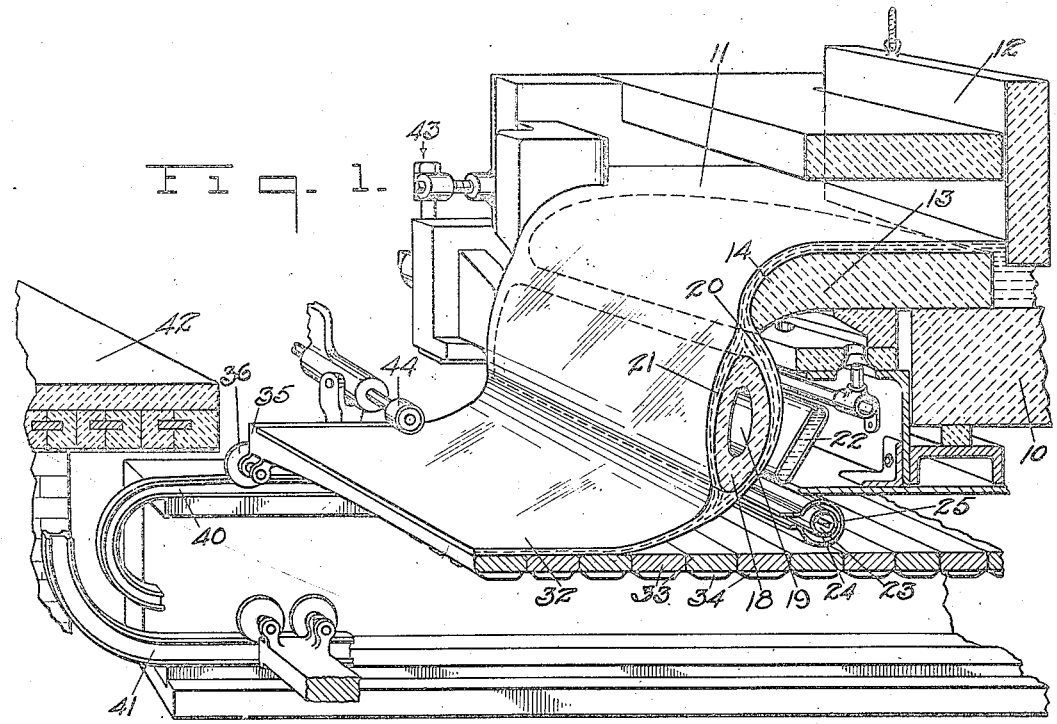
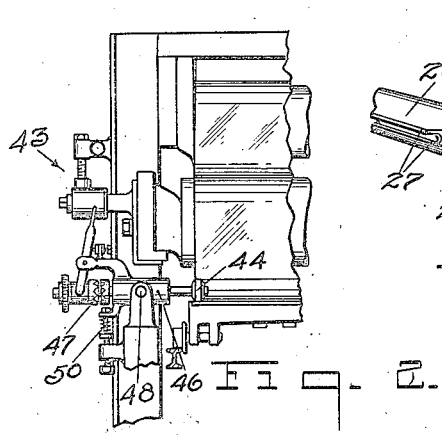
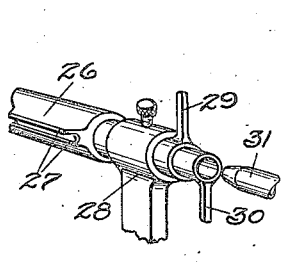
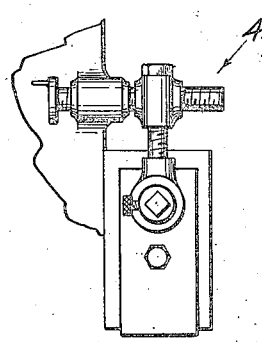
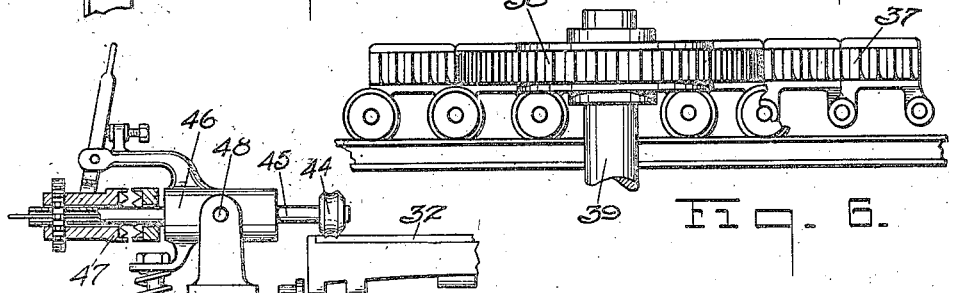
INVENTOR.
Enoch T. Ferngren.
ATTORNEY.

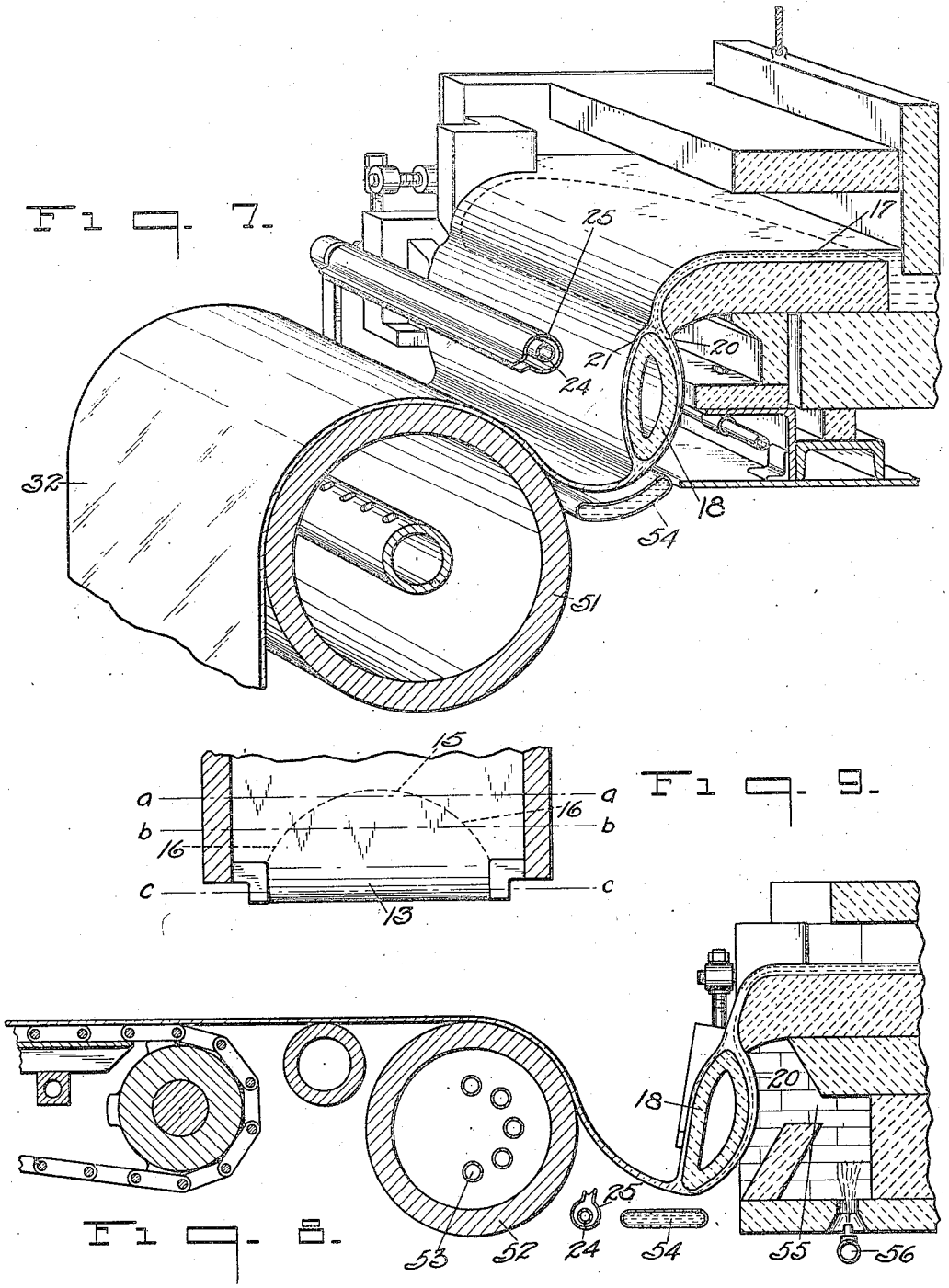

Patented Dec. 17, 1929

1,739,960

UNITED STATES PATENT OFFICE

ENOCH T. FERNGREN, OF TOLEDO, OHIO, ASSIGNOR TO LIBBEY-OWENS GLASS COMPANY, OF TOLEDO, OHIO, A CORPORATION OF OHIO

DOWNFLOW SHEET-GLASS APPARATUS

Application filed December 19, 1924. Serial No. 756,897.

The present invention relates to sheet glass drawing apparatus, and has particular reference to a mechanism wherein a stream of molten glass is flowed down opposite sides of a slab and drawn therefrom in united sheet form.

An important object of the invention is to provide means for uniformly flowing a stream of molten glass down both sides of an internally heated refractory member, one of said streams being relatively thicker than the other.

Another object of the invention is to provide means for flowing a stream of molten glass down both sides of a curved wall refractory slab in a manner that considerable support will be given thereto and the outer surface of one of the streams will be treated in a manner to form a relatively tough skin sufficiently strong to support the weight of the streams when united and drawn from the slab in sheet form.

Still another object of the invention is to provide means of this nature wherein a sheet of glass is formed by flowing a stream of molten glass down both sides of a slab, after which the streams are drawn from the slab, in united sheet form and conveyed preferably over a flattening table and through an annealing leer.

A still further object of the invention is to provide apparatus of this nature wherein the glass from which the sheet is formed is conditioned in a suitable tank and is adapted to overflow over a lip upon a hollow supporting body in a manner that a divided stream will flow down both sides of the body and be drawn therefrom in sheet form, the said overflow lip being of such shape and so related to the tank and the supply of glass therein that the glass overflowing therefrom will have substantially the same stream velocity and temperature throughout its entire width.

Other objects and advantages of the invention will become apparent during the course of the following description.

In the drawings wherein like numerals are employed to designate like parts throughout the same.

Fig. 1 is a fragmentary perspective view, partly in section, of one form of apparatus which may be used, Fig. 2 is a fragmentary plan view of a portion thereof, Fig. 3 is a perspective view of a form of heating or cooling means which may be utilized, Fig. 4 is an elevation of one form of slab mounting, Fig. 5 is an elevation, partly in section, of a portion of the driving mechanism, Fig. 6 is a view showing the drive for the glass conveyor, Fig. 7 is a perspective view, partly in section, showing a slightly modified form of construction, Fig. 8 is a longitudinal vertical section of still another form, and Fig. 9 is a diagrammatic plan view of the overflow lip.

The apparatus herein disclosed may be used either in the manufacture of so-called window glass, or it may be used for the production of blanks suitable for plate glass manufacture.

In the drawings the numeral 10 designates a tank furnace in which a source of molten glass 11 is formed from a batch as will readily be understood. Usually the ingredients which go to make up the glass are introduced at one end of the tank furnace through what is known as a dog-house, after which they are subjected to an intense heat causing the ingredients to melt, after which they pass through refining and cooling chambers to properly condition the glass for sheet glass purposes. In the form shown, a shear-cake 12 is adjustably supported above the discharge end of the furnace 10 and is adapted to be partially submerged in the glass so that the initial speed and quantity advance along the center of the overflow can be controlled, and the median portion shielded from the radiant heat energy of the furnace.

Arranged in the overflow end of the furnace 10 is a curved lip or slab 13 which is preferably formed from a refractory clay material. The overflow end of this tile or lip is curved as at 14 to offer the least resistance to the glass 11 as it overflows therefrom, and also to reduce the tendency of this portion of the lip to wear away.

In order to secure uniformity in quantity discharge along and over the member 13, it is essential to have an approximately equal stream line velocity in the glass along all points of its path of advance over the member. To secure this the rear portion of the member 13 is curved as at 15, shown in Fig. 9, so that the center portion of the lip 13 extends relatively further back into the tank 10 than the edge portions or border portions 16. By shaping the lip 13 in this manner a greater amount of clinging surface and retardation will be given to the molten glass as an impediment to flow along the central portion of the discharge lip where the flow would otherwise normally obtain a relatively too high velocity. By this arrangement a uniform glass advance is established along the entire front of the discharge lip while maintaining an equal depth of stream at all points which is a very important feature in the practice of this or analogous processes where the sheet of glass is formed by drawing from a supply.

Looking at Fig. 9, the flow of glass along the line a—a will be relatively faster at the center of the tank or pot than at the border portions. From a point on line a—a where the glass starts flowing upon the lip 13, due to the relative shallowness of this stream as is indicated by the numeral 17 in Fig. 7, the flow of the glass will be retarded while at the same time, due to the enforced shallowness of this glass, the temperature will be gradually lowered. When the glass has reached the point on imaginary line b—b the speed of the glass at the center and at the border portions of the tank will have become almost equalized as that body of glass moving between the curved end of the lip 13, and the sides of the pot will not in any way be retarded more than its natural slowness caused by its clinging to the edges of the pot. When the glass has reached the discharge end of the lip 13 as indicated by the line c—c the flow of the glass will be uniform throughout the entire width thereof.

Arranged below the discharge end of the lip 13 is a slab 18. The slab 18 is preferably formed from a refractory clay material and is provided with a bore 19 by which means the slab may be internally heated or cooled as desired. In practice it may be found desirable to provide a nichrome or other form of non-corrosive alloy tip along the bottom edge of the slab to prevent or overcome any tendency of the slab to wear away and cause the formation of lines in the sheet being drawn.

The vertical axis of the slab 18, as is shown in Fig. 1, is not arranged in vertical alignment with the discharge end 14 of the lip 13, but is preferably situated in advance of this alignment so that the glass flow which falls upon the slab 18 will be relatively thicker as indicated by the numeral 20 at the rear of the slab than at the front 21.

The natural tendency of the glass on the slab 18, due to the influence of gravity, is to reunite underneath the lower point of said slab, and to thereafter proceed downwardly as it is released from the retarding influence of the member with a gradual increase in speed in response to the gravity of its mass below the slab.

The rear thicker stream 20 on the slab 18 which faces toward the supply or furnace chamber is first exposed to considerable heat energy from the heating space beneath the body of the discharge lip 13. The effect of this heat on the lower portion as it bends over the slab 18 is to promote flow movement and to reduce the clinging tendencies of the glass to the refractory material from which the slab 18 is formed. The effect of the heating of the glass surface is to insure that the extreme lower point of the slab 18 will deliver heat into the glass, and also that the glass will not cling to this member at the line of departure, thus insuring that the bottom course of the glass flow which clings to the member 18 will be free from markings or lines. In addition to these causes an important reason for heating the back surface of the stream 20 is to change the nature of the glass in its extreme surface skin or film by maintaining a temperature condition which will induce fluency and promote adsorption and reduce the percentage of sodium in the skin or film, thus making the glass of this rear surface of a slightly harder or more cohesive nature, and more readily hardened or toughened when cooled than the glass immediately adjacent thereto.

As this surface skin is progressively moving downwardly with the rest of the body of glass on the rear portion of the refractory slab it is subjected to the influence of a water-cooler 22, which removes heat from the entire rear portion of the down-flow, thus causing the preferably fluid surface film thereon to attain a considerable degree of tough or semi-rigid structure, which may be termed a skin. At the same time that the cooling action is taking place the heating from the interior of the slab is counteracting the local cooling effect in the inner portion of the downwardly flowing glass as it rounds the lower part of said slab, thus confining the cooling largely to that surface portion of the rear flow which has preferably received an intensive heating action. To further cool the skin a cooling means 23 may be utilized to blow a cold blast of air thereon.

This cooler comprises an inner cylindrical member 24 having a plurality of apertures 25 formed on the rear surface thereof. A casing 26 having the spaced parallel ends 27 is arranged around the inner pipe 24 in a manner that a cold blast of air or a charge of gas passing through the pipe 24 will be allowed to escape through the apertures 25 and pass around between the pipe 24 and casing 26 in a manner that a uniform blast will issue from between the ends 27. This type of construction can be used for either cooling or heating. In the present instance it is adjustably supported by means of the standard 28 through which the outer member 26 is journaled and is movable by means of a handle 29. The inner pipe or tubular construction 24 is journaled through the casing 26 and is likewise operable by the handle 30. A nozzle 31 is employed to introduce the ultimate cooling or heating medium within the said member.

As the streams 20 and 21 unite at the lower end of the slab 18, as is shown in Fig. 1, the united sheet 32 is drawn and adapted to be carried away by the endless conveyor 33.

During the bending and stretching progression of the glass in response to the drawing force, it is necessary to change the heated surface glass from a relatively fluid to a more tenacious nature, and to particularly affect the rear surface of the glass by sufficient cooling, as has been pointed out, preferably by a careful and relatively gentle air cooling along the point of bend where the base of the sheet forming glass comes under the main tractive pull.

As the sheet formation is drawn from the supply glass at the lower end of the refractory slab 18, the quantity of glass contained therein will be largely supported on the toughened outer surface skin through which most of the drawing tension will be communicated. In other words, the surface skin formed on the stream 20 has been so toughened that it will support the weight of the remainder of the sheet being formed as it leaves the slab 18. On the other hand the heating and cooling action should not be of a nature that the outer surface is marred.

As above pointed out, one of the films of glass on the slab 18 is relatively thicker than the other film, and as shown in Fig. 1, in this particular instance the rear film flowing down the back of the slab is the thickest. The outer surface of the rear film is chilled or otherwise treated to form a skin of a nature capable of supporting the balance of the sheet. This supporting action is desirable during the time that the sheet is being deflected into a substantially horizontal plane, and it is also desirable to prevent marring of the under surface of the glass when in contact with its horizontally moving support. In the formation of this skin, however, care should be exercised to prevent excessive chilling of the glass film on the slab, that is, to prevent the film from becoming chilled throughout its entire thickness. To prevent undue chilling, the slab is internally heated and the thickness of the film is such that a skin can be formed thereon and yet the chilling will practically be confined to the surface of the film by reason of the internal heating of the slab. Therefore, even though the skin is formed the glass will nevertheless be fluid enough to flow down the surface of the slab. Further, due to the thickness of the rear film on which the skin is formed, the glass will be sufficiently hot and plastic on its inner surface to unite with the front relatively thin film. On the other hand, if the rear film were relatively thinner, the chilling thereof to form the desired skin would tend to completely chill the film and stop downward movement of the glass along the slab surface and to also "set" the glass so that it would not readily unite with the other film to form a single sheet.

The endless conveyor 33 comprises a plurality of slats 34 which have an upper smooth face, which, when placed side by side as shown in Fig. 1, present a perfectly flat and smooth surface. The slats 34 are carried by frames 35 along the bottom of which are journaled wheels or casters 36.

The ends of the frames 35 are provided with teeth 37 so that the entire edge of the conveyor will present in effect a rack bar adapted to mesh with a drive pinion 38 driven from a power shaft 39. Upon rotation of the power shaft 39 and pinion 38 the endless conveyor can be moved along the upper track 40. Arranged below the track 40 is a lower track 41 spaced at its ends in a manner that the wheels 36 can pass from the upper surface of the upper track to the upper surface of the lower track as indicated in Fig. 1, thus creating an endless conveyor which can be used for carrying the sheet 32 from the end of the slab 18. The sheet passes from the conveyor through any suitable annealing leer 42.

To facilitate accurate control of the sheet being formed, the slab 18 is mounted in a manner for universal adjustment. The adjusting means is designated broadly by the numeral 43 in Fig. 4.

If it is desired, rotatable rolls 44 may be employed to engage the border portions of the sheet 32 to prevent shrinkage or any tendency of the sheet to narrow after it has been deposited upon the endless conveyor 33. As shown in Fig. 1 the sheet 32 is in this embodiment of the invention carried away from the substantially vertical slab in a horizontal plane as soon as the sheet is formed.

The rolls 44 may either be driven mechanically or rotated by frictional contact with the sheet. The rolls 44 are carried upon shafts 45, journaled as at 46, and operable through means of a clutch 47. The bearing 46 is pivoted as at 48 to a standard 49 so that the roll 44 can be adjusted to any thickness of sheet. A spring 50 is employed to hold the roll in contact with the sheet.

In Figs. 7 and 8 is shown a slightly modified form of construction wherein, instead of carrying the sheet 32 away on a conveyor, it is passed over a rotatable drum 51 as shown in Fig. 7. In Fig. 7 the top of the drum is substantially lower than the top of the slab 18, while in Fig. 8 the drum 52 and slab 18 are in alignment. The drum is used to prevent any possibility of forming raised lines on the surface of the glass sheet between adjacent edge portions of the slats 34 crosswise of the sheet. If a drum is employed, particularly in the forming of a heavy sheet, it will be decidedly advantageous as a process step to draw and carry the sheet from the lower point of the member 18 first slightly downward and thereafter upward, which means that when using a large drum as a sheet carrying and flattening element, the upper portion of the drum should preferably be on the level, as shown in Fig. 7. The temperature of the drums may be controlled internally by means of a pipe or pipes 53.

The arrangement shown in Fig. 8 is slightly modified in that a cooler 54 is disposed in proximity to the lower edge of the slab 18, while the rear relatively thicker stream 20 is heated by means of radiated heat from the chamber 55 which is heated by the burner 56. The sheet may either be drawn off in a horizontal plane as in Fig. 8, or again carried off in a vertical plane as in Fig. 7.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass drawing apparatus, a slab, means to flow a stream of glass down both sides thereof, one of said streams being relatively thicker than the other, means for creating an outer skin on the thicker of said streams, and means for taking the streams from the slab in united sheet form.

2. In sheet glass apparatus, a slab, means to flow a stream of glass down both sides thereof, means to create a skin on the outer surface of one of the streams, and means for taking the streams from the slab in united sheet form.

3. In sheet glass apparatus, a slab, means to flow a stream of glass down both sides thereof, means to create a skin on the outer surface of one of the streams, and means for taking the streams from the slab in united sheet form and substantially in a horizontal plane.

4. In sheet glass apparatus, a slab, means to flow a stream of glass down both sides thereof, one of said streams being relatively thicker than the other, means to create a skin on one of the streams of sufficient strength to support said stream, and means to draw the streams from the slab in united sheet form.

5. In sheet glass apparatus, a slab, means to flow a stream of glass down both sides of a slab, one of said streams being relatively thicker than the other, means to create a skin on the outer surface of the thicker stream, a drum, and means to draw the streams from the slab in united sheet form and to pass the same over said drum in a manner that the skin will contact therewith.

6. The process of producing sheet glass, consisting in flowing an unequally divided stream of molten glass down the sides of a slab, cooling one of the streams in a manner to form a skin thereon, and then drawing the stream from the slab in united sheet form.

7. The process of producing sheet glass, consisting in flowing a divided stream of molten glass down the sides of a slab, cooling one of the streams in a manner to form a skin thereon, and then drawing the streams from the slab in united sheet form.

8. The process of producing sheet glass, consisting in flowing a divided stream of molten glass down the sides of a slab, cooling the outer surface of one of the streams in a manner to form a skin thereon, simultaneously heating the inner surface of the stream to limit the thickness of the skin formed, and then drawing the streams from the slab in united sheet form.

Signed at Toledo, in the county of Lucas and State of Ohio, this 15th day of December, 1924.

ENOCH T. FERNGREN.